United States Patent
Koizumi et al.

(10) Patent No.: US 12,359,347 B2
(45) Date of Patent: Jul. 15, 2025

(54) LOW LEACHABLE FIBERS AND FIBER STRUCTURE

(71) Applicant: KURARAY CO., LTD., Kurashiki (JP)

(72) Inventors: Satoshi Koizumi, Kurashiki (JP); Akihiro Uehata, Sakai (JP); Tetsuya Tomosugi, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 18/358,307

(22) Filed: Jul. 25, 2023

(65) Prior Publication Data

US 2023/0366130 A1    Nov. 16, 2023

Related U.S. Application Data

(63) Continuation of application No. 16/620,994, filed as application No. PCT/JP2018/021425 on Jun. 4, 2018, now abandoned.

(30) Foreign Application Priority Data

Jun. 13, 2017    (JP) ................................ 2017-116327

(51) Int. Cl.
| | | |
|---|---|---|
| *D01F 6/30* | (2006.01) | |
| *B01D 39/16* | (2006.01) | |
| *D01F 6/62* | (2006.01) | |
| *D01F 8/06* | (2006.01) | |
| *B01D 39/00* | (2006.01) | |

(52) U.S. Cl.
CPC ........... *D01F 6/30* (2013.01); *B01D 39/1623* (2013.01); *D01F 6/62* (2013.01); *D01F 8/06* (2013.01); *B01D 2239/0225* (2013.01); *B01D 2239/0233* (2013.01); *B01D 2239/0618* (2013.01)

(58) Field of Classification Search
USPC ..................................................... 210/500.1
See application file for complete search history.

(56) References Cited

U.S. PATENT DOCUMENTS

| | | |
|---|---|---|
| 2003/0216096 A1 | 11/2003 | Berrigan et al. |
| 2008/0290549 A1 | 11/2008 | Da Cunha et al. |
| 2009/0293279 A1* | 12/2009 | Sebastian ............ D06M 10/025 29/896.62 |
| 2010/0272994 A1 | 10/2010 | Carlson et al. |
| 2011/0198280 A1 | 8/2011 | Jones et al. |
| 2011/0212660 A1 | 9/2011 | Okawa |
| 2014/0308868 A1 | 10/2014 | Nambiar et al. |
| 2015/0322256 A1 | 11/2015 | Sawaguchi et al. |
| 2018/0105964 A1 | 4/2018 | Okawa |

FOREIGN PATENT DOCUMENTS

| | | |
|---|---|---|
| JP | 11-107153 A | 4/1999 |
| JP | 2002-180325 A | 6/2002 |
| JP | 2003-138459 A | 5/2003 |
| JP | 2010-111978 A | 5/2010 |
| JP | 2011-102448 A | 5/2011 |
| JP | 2012-6304 A | 1/2012 |
| JP | 5020459 B2 | 9/2012 |
| JP | 102939412 A | 2/2013 |
| JP | 2017-222934 A | 12/2017 |
| WO | WO 2005/084777 A1 | 9/2005 |
| WO | WO 2008/141406 A1 | 11/2008 |
| WO | WO 2011/158644 A1 | 12/2011 |
| WO | WO 2014/087935 A1 | 6/2014 |
| WO | WO 2016/194553 | 12/2016 |

OTHER PUBLICATIONS 2016, vol. 45(6) 1308-1321 !The Author(s) 2014 Reprints and permissions: sagepub.co.uk/journalsPermissions.nav (Year: 2016).*
STIC Translation provided Oct. 31, 2024 (Year: 2024).*
International Search Report issued Aug. 7, 2018 in PCT/JP2018/021425 filed on Jun. 4, 2018, 2 pages.
Chan I. Chung, "Extrusion of Polymers" *Theory & Practice*, 2nd Edition, ISBNs 978-1-56990-459-6 (2010), 47 pags.
J.A. Brydson, "Aliphatic Polyolefins Other than Polyethylene, and Diene Rubbers," *Plastic Materials*, 7th Edition, (1999), Butterworth-Heinemann (66 pages).
Characterizing Bicomponent Fibers to Determine Their Quasi-Static and Dynamic Mechanical Behavior, Sponsored by KLA Instruments, Saved from URL: https://www.azonano.com/article.aspx?Article1D=4245 (Year: 2016).
Gregory et al., Improving Properties and Processing Performance of Melt-Spun Fibers, pp. 15-21 (Year: 2000).
Extended European Search Report issued Apr. 29, 2020 in corresponding European Patent Application No. 18817053.4, 8 pages.
European Office Action issued Jan. 14, 2021 in European Patent Application No. 18817053.4, 7 pages.
Arun Kumar Pradhan, et al., "An approach of optimal designing of nonwoven air filter media: Effect of fibre fineness," Journal of Industrial Textiles, vol. 45, No. 6, XP055762446, 2014, pp. 1308-1321.

* cited by examiner

*Primary Examiner* — Allison G Fitzsimmons
(74) *Attorney, Agent, or Firm* — Oblon, McClelland, Maier & Neustadt, L.L.P.

(57) ABSTRACT

A fiber including olefin-based resin, wherein temperatures of the olefin-based resin losing five percent by weight and the fiber losing five percent by weight have a difference of 20 degrees Celsius or below according to thermogravimetric measurements.

7 Claims, No Drawings

LOW LEACHABLE FIBERS AND FIBER STRUCTURE

The present application is a continuation of U.S. application Ser. No. 16/620,994 filed Dec. 10, 2019, pending, which is a National Stage of PCT/JP2018/021425 filed Jun. 4, 2018 and claims the benefit of JP 2017-116327 filed Jun. 13, 2017.

TECHNICAL FIELD

The present invention is a fiber including olefin-based resin and relates to low leachable fiber and a fiber structure used by water filtration filters, clean room air filters and medical fiber structures such as pharmaceutical packaging material and testing containers.

BACKGROUND ART

Cyclic olefin-based resin is molded in various ways due to its high transparency, high heat resistance, chemical resistance, low leachable properties and low adsorption capacity. Its uses include, for example, medical applications such as pharmaceutical packaging and testing containers, optical applications such as lenses and optical film, and electronic device applications.

Cyclic olefin-based resin should be applied to water filtration filters and clean room air filters because it has few impurities and superior low leachable properties. Molding the cyclic olefin-based resin to a fibrous state is being considered.

More specifically, a proposed invention includes a core-sheath conjugated fiber and a nonwoven fabric comprising: a core part made from a thermoplastic resin composition; a sheath part made from a cyclic olefin-based resin composition with its main element being a cyclic olefin-based resin; wherein, the thermoplastic resin composition includes either an amorphous thermoplastic resin that has a glass melting point (Tg) that is higher than the glass melting point of the cyclic olefin-based resin (TgA), or a crystalline thermoplastic resin with a melting point (Tm) that is higher than its glass melting point (TgA).

In order to have the cyclic olefin-based resin in the sheath part, this core-sheath conjugated fiber contains a significantly low amount of metal and does not cause metal leaching problems even when used in strong acid or strong alkaline environments (see, for example, Patent Document 1).

A filter cartridge is proposed that uses nonwoven fabric made from polypropylene resin, is formed by melt spinning a polypropylene polymer polymerized with a metallocene catalyst, and has xylene solubles of one percent by weight or less and leached chloride ions of one percent by weight or less.

Since the amount of leaching of olygomers of organic solvents and the amount of leaching of chloride ions are low, this filter cartridge does not require cleaning by fluorocarbon-based solvents or halogen-based solvents and requires very little to no cleaning by ultra pure water (see, for example, Patent Document 2).

CITATION LIST

Patent Documents

PATENT DOCUMENT 1: International Publication No. WO 2011/158644

PATENT DOCUMENT 2: International Publication No. WO 2005/084777

SUMMARY OF THE INVENTION

Technical Problem

While the invention in Patent Document 1 takes advantage of how the resin composition configuring the fiber contains a remarkably low amount of metal content, it does not consider the leaching of impurities with a low molecular weight caused by the deterioration of the resin that is heated during the spinning process.

Patent Document 2 requires using a raw material resin with a low melt float rate; however, in this case, the flow of the resin should be improved for the stability of the spinning process and it is necessary to set a high spinning temperature. This causes the thermal decomposition of the resin to accelerate and creates the problem of facilitating the leaching of impurities with a low molecular weight.

In view of the foregoing, it is an object of the present invention to provide a fiber that can reduce the leaching of impurities with low molecular weight by controlling the deterioration of olefin-based resin when heated during its spinning process.

Solution to the Problem

In order to accomplish the above object, the fiber from the present invention includes olefin-based resin and is made so the difference between the temperatures at which the weight of the olefin-based resin was reduced by five percent and the weight of the fiber was reduced by five percent is 20 degrees Celsius or below.

Advantages of the Invention

The present invention provides a fiber that contains a remarkably low amount of impurities with low molecular weight by controlling the deterioration of olefin-based resin when being heated.

DESCRIPTION OF EMBODIMENTS

The present invention is a fiber containing olefin-based resin that can have the leaching of impurities with a low molecular weight reduced by controlling the deterioration of olefin-based resin when heated during the spinning process.

(Olefin-Based Resin)

The olefin-based resin of the present invention can include polyethylene (PE), polypropylene (PP) or a copolymer thereof. Specific examples include low-density polyethylene, linear low-density polyethylene, medium-density polyethylene, high-density polyethylene, polypropylene, or a two-dimensional copolymer of polypropylene and polyethylene.

(Cyclic Olefin-Based Resin)

An example of the olefin-based resin for the present invention may be a cyclic olefin-based resin. The cyclic olefin-based resin includes a cyclic olefin component as a copolymer component and does not have any particular limitations so long as it is an olefin-based resin that includes a cyclic olefin component in the main chain. Some examples may include condensation and addition polymers of cyclic olefin or their hydrogenated products, and condensation and addition copolymers of cyclic olefin and alpha olefin or their hydrogenated products.

More specifically, the cyclic polyolefin-based resin may be a condensation and addition copolymer of cyclic olefin of Formula (I) and an alpha-olefin or their hydrogenated products.

[Formula 1]

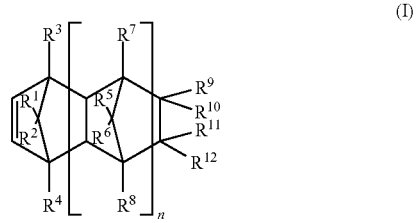

(I)

(In the Formula, R1-R12 can each be the same or be different and are selected from groups that consist of hydrogen atoms, halogen atoms and hydrocarbon groups. R9 and R10 as well as R11 and R12 can be integrated to form a divalent hydrocarbon group. R9 or R10 as well as R11 or R12 can each form a cycle. "N" represents 0 or a positive integer and, when "n" is 2 or higher, R5-R8 can be the same or be different within their respective repeat units.)

For the cyclic olefin-based resin, the polyolefin-based resin that is included in the main chain of the structural unit derived from the cyclic olefin includes a grafted and/or co-polymerized unsaturated compound having a polar group so long as it is within a range that does not inhibit the effect of the present invention.

Examples of the polar group may include a carboxyl group, an acid anhydride group, an epoxy group, an amide group, an ester group, and a hydroxyl group. Examples of the unsaturated compound may include (meth)acrylic acid, maleic acid, maleic anhydride, itaconic anhydride, glicidyl (meth)acrylate, (meth)acrylic acid alkyl (carbon atom numbers 1-10) ester, maleic acid alkyl (carbon atom numbers 1-10) ester, (meth)acrylamide and (meth)acrylic acid-2-hydroxyethyl.

The cyclic olefin-based resin according to the present invention may use a commercially available resin. Examples of a commercially available cyclic olefin-based resin may include TOPAS® (made by TOPAS Adavanced Polymers, Inc.) and APEL® (made by Mitsui Chemicals, Inc.). Examples of a commercially available cyclic olefin polymer manufactured by ring-opening polymerization of a cyclic olefin component (the starting material) using a metathesis catalyst, followed by hydrogenation, may include ZEONEX® (made by Nippon Zeon Co., Ltd.), ZEONOR® (made by Nippon Zeon Co., Ltd.) and ARTON® (made by JSR Co., Ltd.). The use of cyclic olefin copolymers is preferred for the cyclic olefin-based resin according to the present invention.

An example of the cyclic olefin-based resin according to the present invention includes a cyclic olefin-based copolymer that has a structural unit derived from a cyclic olefin illustrated in Formula (I) and an ethylene and/or an alpha-olefin.

While the alpha-olefin of the cyclic olefin copolymer does not have any particular restrictions, an alpha-olefin with a carbon atom number between two and twenty is preferred. Examples include ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eikosene. These alpha-olefin components can be used alone, or in a combination of two or more. It is preferred that, between the ethylene and/or the alpha-olefin, the ethylene is used by itself.

The cyclic olefin from the cyclic olefin-based copolymer shown in Formula (I) can be used alone, or in a combination of two or more. It is preferred that, within the cyclic olefin illustrated in Formula (I), bicyclo[2.2.1]hept-2-ene (commonly used name: norbornene) be used independently.

Neither the co-polymerization method of the alpha-olefin and the cyclic olefin illustrated in Formula (I) nor the hydrogenation method of the obtained copolymer has any particular limitations in attaining the cyclic olefin copolymer and can be performed by well-known methods. It can be a random copolymer or a block copolymer, but a random copolymer is preferred.

There are no particular limitations regarding the copolymer catalysts used to obtain the cyclic olefin copolymer and well-known methods can be used with well-known catalysts such as Ziegler-Natta-based catalysts, metathesis-based catalysts, or metallosen-based catalysts. The cyclic olefin-based copolymer to be used for the present invention is preferably made by co-polymerizing cyclic olefin and alpha-olefin using a metallocene-based catalyst.

The cyclic olefin-based copolymer for the present invention is most preferably made from ethylene and norbornene.

(Melt Viscosity)

Regarding the melt viscosity of the resin for the present invention, the melt flow rate can be within the range of 3 to 100, preferably a range of MFR 5 to 80, and more preferably a range of 10 to 50 from the perspective of the fiber-forming process and strengthening of the fiber. The melt flow rate ("MFR") above is measured in accordance with the standards from JIS K 7210, "Plastic—Testing methods of the melt mass flow rate (MFR) and the melt volume flow rate (MVR) of thermoplastics."

(Single Filament Fineness)

It is preferred that the single filament fineness of the present invention is 10 dtex or below. The single filament fineness would preferably be 0.1 dtex or more and 5 dtex or less, more preferably 0.5 dtex or more and 3 dtex or less. By setting the simple fiber fineness to the range above, the filter function can more easily be utilized when used by a water filtration filter or a clean room air filter because the gap between the fibers becomes smaller.

(Average Fiber Length)

When the fiber of the present invention is used for a wet-laid nonwoven fabric, a wet-laid hydro-entangled nonwoven fabric or a dry-laid nonwoven fabric made from an air raid method, it is preferred that the average length of a single filament is between 1 mm and 20 mm, more preferably between 2 mm and 10 mm. Having the average length of the fiber to be smaller than 1 mm is not preferred because the process condition can remarkably worsen from the net clogging due to fiber falling during the production process of the nonwoven fabric, and fabric on the web being cut due to the entanglement of the fiber becoming weaker. Having the average length of the fiber to be longer than 20 mm is not preferred because the dispersibility of the fabric worsens due to tangling during the production process of the nonwoven fabric and the texture of the nonwoven cloth obtained becomes worse.

When the fiber of the present invention is used as dry-laid nonwoven fabric that is of a card-type, the average length of the simple fiber is preferably from 10 mm to 200 mm, more preferably from 20 to 100 mm. If the average length of the fiber is smaller than 10 mm, the process condition can remarkably worsen from fiber falling into the card machine and fabric on the web being cut due to the entanglement of the fiber becoming weaker. It is not preferred for the average length of the fiber to be longer than 200 mm because the texture of the nonwoven fabric obtained worsens due to how the fiber cannot be defibrated during the production process of the nonwoven fabric which creates tangling (nubs) on the yarn.

(Shape of the Fiber)

The cross-sectional shape of the fiber of the present invention does not have any limitations and can have a circular, mid-air, oval-plane, or star-shaped cross-section. An appropriate form of fibers in the nonwoven fabric to be used can be freely selected from forms such as short cut fibers and staple fibers.

For the fiber of the present invention, the entire surface can be olefin-based resin. For composite fiber, part of the surface can be olefin-based resin.

If it is a composite fiber, the structure of the cross-sectional shape can be a core-in-sheath-type, a sea-island-type or a parallel-type (a multilayer bonded type).

If it is a core-in-sheath type structure, a thermoplastic resin can be used in the core part and the olefin-based resin of the present invention can be used in the sheath part. If it is a sea-island type structure, the olefin-based resin from the present invention can be used in the sea part and a thermoplastic resin can be used in the island part. If it is a parallel-type structure, the layer made from the olefin-based resin of the present invention and thermoplastic resin layer are bonded together.

The thermoplastic resin above does not have any limitations so long as it is a resin that can form a core-in-sheath-type, sea-island-type and parallel-type composite fiber. Specific examples include: aromatic polyesters such as polyethylene terephthalate (PET), isophthalic acid-modified PET, sulfoisophthalic acid-modified PET, polybutylene terephthalate, polyhexamethylene terephthalate; aliphatic polyesters such as polylactic acid, polyethylene succinate, polybutylene succinate, polybutylene succinate adipate, polyhydroxybutyrate-polyhydroxyvalerate resin; polyamide such as polyamide 6, polyamide 66, polyamide 10, polyamide 11, polyamide 12, polyamides 6-12; and polyolefin such as polypropylene, polyethylene, polybutene, polymethylpentene and chlorinated-based polyolefins. These can be used alone, or in a combination of two or more.

(Temperature of Losing Five Percent by Weight)

In the present invention, the difference between the temperatures at which the olefin-based resin that is the raw material resin loses five percent by weight and the fiber containing the olefin-based resin loses five percent by weight is 20 degrees Celsius or lower according to thermogravimetric measurements. By setting the difference of the temperatures of losing five percent by weight to 20 degrees Celsius or less, the deterioration of olefin-based resin from the heating during the spinning process can be controlled and the leaching of impurities (organic substances) with a low molecular weight can be reduced. As a result, a fiber that contains a remarkably low amount of impurities can be obtained.

Even if the raw material olefin-based resin has low leachable properties, there is still the problem that the resin deteriorates and impurities of low molecular weight leach due to heating during the spinning process that fiberizes the resin. The present inventors noticed that the temperature at which five percent by weight of the resin configuring the fiber decomposes falls because the heat resistance of the resin decreases as the fiber deteriorates from being heated. The present inventors succeeded in obtaining a fiber with remarkably few impurities with low molecular weight contained in the fiber resin due to how the difference between the temperatures at which the olefin-based resin that is the raw material resin loses five percent by weight and the fiber containing the olefin-based resin loses five percent by weight is 20 degrees Celsius or lower upon being measured thermogravimetrically.

The lowering of heat resistance of the olefin-based resin can be reduced by controlling the decrease of molecular weight caused by the deterioration of olefin-based resin from heating.

This "temperature of losing five percent by weight" refers to the temperature at the time when the mass reduction rate is 5 percent from being thermogravimetrically measured according to the standards of JIS K 7120, "Thermograivemtric measurement methods of plastic."

(Spinning)

The spinning method of the present invention can be a dry spinning method, a wet spinning method or a melt spinning method; however, the melt spinning method is especially appropriate. After the melt-spun olefin-based resin of the present invention is pushed out from the nozzle, fiber can be obtained by a method of winding while cooling. When the fiber of the present invention is obtained, the fiber obtained from spinning can be stretched at a later step.

While the olefin-based resin can be spun within a temperature range that can melt or soften the resin with heat during the spinning process, it is preferred that the temperature is as low as possible to reduce thermal decomposition of the olefin-based resin. If, the olefin-based resin to be used is, e.g., an amorphous resin, its spinning temperature is preferably at or above the glass transition temperature and at or below 250 degrees Celsius above the glass transition temperature, more preferably at or above the glass transition temperature and at or below 200 degrees Celsius above the glass transition temperature. If a crystalline resin is used, the temperature is preferably at or below the melting point and at or below two hundred degrees Celsius above the melting point; more preferably at or below the melting point and at or below one hundred degrees Celsius above the melting point. The glass transition temperature and the melting point can be obtained by measuring the temperature increase at 10 degree Celsius per minute up until 400 degrees Celsius within a nitrogen atmosphere using a "TA3000-DSC" made by Mettler Toledo. The glass transition temperature was figured from observing the inflection points on the DSC chart and the melting point was set at the exothermic peak temperature.

Regarding the spinning process, the thermal decomposition of the olefin-based resin is preferably reduced by removing oxygen gases and replacing them with inert gases (such as nitrogen gas).

(Fiber Structure)

As stated above, the fiber of the present invention can be appropriately used for water filtration filters, clear room air filters, pharmaceutical packaging and as the medical fiber structure for testing containers because of its excellent quality that it contains a significant low amount of impurities of low molecular weight.

Examples of the fiber structure of the present invention can include woven fabric, knitted fabric, nonwoven fabric and other structural bodies of fabrics configured by cotton used by the foregoing. No particular limitations exist for the production method so long as they are well-known production methods, such as the carding method, the air raid method and the wet method for nonwoven fabric.
(Thickness)

The thickness of the fiber structure from the present invention can be within a range of 0.1 mm to 10 mm, preferably a range of 0.5 mm to 8 mm, and more preferably a range of 1 mm to 5 mm due to how processing would be easier when used for filters or medical fiber structure. The thickness above can be obtained by measuring according to the standards of JIS L 1096, "Testing method of woven and knitted cloth," and JIS L 1913, "Testing method of general nonwoven fabric."

(Basis Weight)

The basis weight of the fiber structure of the present invention can be within a range from 5 g/m$^2$ to 1000 g/m$^2$, preferably from 10 g/m$^2$ to 500 g/m$^2$, and more preferably from 30 g/m$^2$ to 200 g/m$^2$ due to how processing would be easier when used for filters or as a medical fiber structure. The basis weight above can be obtained by measuring according to the standards of JIS L 1096, "Testing method of woven and knitted cloth," and JIS L 1913, "Testing method of general nonwoven fabric."

(Air Permeability)

The air permeability of the fiber structure from the present invention can be within a range from 0.5 cm$^3$/cm$^2$/second to 500 cm$^3$/cm$^2$/second, preferably, a range from 10 cm$^3$/cm$^2$/second to 300 cm$^3$/cm$^2$/second, and more preferably a range from 20 cm$^3$/cm$^2$/second to 200 cm$^3$/cm$^2$/second in order to secure air permeability and improve collection efficiency when the invention is used for filters. The air permeability above was obtained by measuring according to the standards of JIS L 1096, "Testing method of woven and knitted cloth."

EXAMPLES

The present invention is described below based on examples. Note that the present invention shall not be limited to these examples. These examples may be modified and changed based on the intent of the present invention. Such changes and modifications shall not be excluded from the scope of the invention.

Example 1

<Preparation of the Fiber>

The fiber for the present example (single filament fineness 3.3 dtex) was obtained by melt extruding a cyclic olefin-based copolymer (using the TOPAS8007S-04 made by Polyplastics Co., Ltd.) with a MFR of 32 and that has a glass transition temperature of 78 degrees Celsius upon setting the temperature of the extruder and the pipe at 270 degrees Celsius in an environment where the extruder and the pipe are purged of nitrogen, discharged through a nozzle with a pore diameter of 0.12 mm, and wound at a speed of 1500 m/minute.

(Measuring the Temperature of Losing Five Percent by Weight)

The weight change of the cyclic olefin-based copolymer (raw material resin) and the prepared fiber were measured under a nitrogen atmosphere using a thermogravimetric apparatus (using a TG-DTA Heat Analysis Apparatus Thermoplus 2 made by Rigaku Co., Ltd.).

More specifically, the measurements were taken under the conditions of the test weight being approximately 10 mg and the temperature being raised at a speed of 10 degrees Celsius per minute, and the temperature of losing five percent by weight was set as the temperature at which five percent of the mass of the test weight was lost since the measurements began. The difference between the temperatures of the cyclic olefin-based resin losing five percent by weight and the fiber losing five percent by weight was calculated with thermogravimetric analysis. Table 1 shows the results.

<Evaluation of Leachability>

An extraction solution was prepared by placing 1 g of the prepared fiber in 100 ml of pure water for 24 hours at 25 degrees Celsius. The total organic carbon ("TOC") value (mg/L) of the extraction solution was measured by a TOC measurement apparatus (using TOC150 made by Toray Engineering Co., Ltd.) and was set as the amount of organic material eluted from the fiber. Table 1 shows the results.

Example 2

The fiber for the present example (single filament fineness 1.7 dtex) was made by melt extruding a cyclic olefin-based copolymer (using the TOPAS6013S-04 made by Polyplastics Co., Ltd.) with a MFR of 14 and a glass transition temperature of 138 degrees was used as a raw material resin upon setting the temperature of the extruder and the pipe at 280 degrees Celsius in an environment where the extruder and the pipe are purged of nitrogen, discharged through a nozzle with a pore diameter of 0.12 mm, and wound at a speed of 1500 m/minute.

Similar to Example 1 above, the temperature of losing five percent by weight was measured and the leachability was evaluated. Table 1 shows the results.

Example 3

A fiber (single filament fineness 1.7 dtex) was made in the same manner as Example 2 except with the alteration of setting the temperature of the extruder and the pipe at 300 degrees Celsius. Similar to Example 1 above, the temperature of losing five percent by weight was measured and the leachability was evaluated. Table 1 shows the results.

Example 4

A cyclic olefin-based copolymer (TOPAS6013S-04 made by Polyplastics Co., Ltd.) with a MFR of 14 and a glass transition temperature of 138 degrees was set as the sheath component, and a thermoplastic copolymer made from polyethylene terephthalate was set as the core component. These components were bonded into a core-sheath type using a composite spinning apparatus with a round cross-sectional base that was purged of nitrogen at a spinning temperature of 300 degrees Celsius and a composite rate (cyclic olefin copolymer/polyethylene terephthalate) of 50/50 (weight ratio), and collected. The fiber (single filament fineness 2.0 dtex) having a core-sheath type structure of the present example was obtained after the yarn was spun out, cooled, solidified, and wound in a bobbin through a take-up roller.

Similar to Example 1 above, the temperature of losing five percent by weight was measured and the leachability was evaluated. Table 1 shows the results.

For the present example, the temperature of losing five percent by weight was set as the temperature when the mass ratio (50 mass percent) of the sheath component compared to the entire core-sheath conjugated fiber was reduced by five percent (the 47.5 percent mass loss, which is a five percent loss of the 50 mass percent). Table 1 shows the results.

Example 5

A fiber (single fiber fineness 3.3 dtex) was prepared in the same manner as Example 1 except with the alterations that a polypropylene (Y2005GP made from Prime Polymer Co., Ltd.) having a melting point of 161 degrees Celsius and a MFR of 20 was used as a raw material resin that was melt extruded from an extruder and a pipe, both purged of nitrogen, at a temperature of 300 degrees Celsius. Similar to Example 1 above, the temperature of losing five percent by weight was measured and the leachabiliity was evaluated. Table 1 shows the results.

Comparative Example 1

A fiber (single fiber fineness 3.3 dtex) was made in the same manner as Example 1 except with the alteration of setting the temperature of the extruder and the pipe at 450 degrees Celsius for melt extrusion. Similar to Example 1 above, the temperature of losing five percent by weight was measured and the leachability was evaluated. Table 1 shows the results.

Comparative Example 2

A fiber (single fiber fineness 1.7 dtex) was prepared in the same manner as Example 2 except with the alteration of setting the temperature of the extruder and the pipe at 310 degrees Celsius and that both the extruder and the pipe were not purged of nitrogen. Similar to Example 1 above, the temperature of losing five percent by weight was measured and the leachability was evaluated. Table 1 shows the results.

In Table 1, the PET is polyethylene terephthalate and the PP is polypropylene.

Regarding the fiber from Example 1 to Example 5 that each have a difference of 20 degrees Celsius or below between the temperatures of the olefin-based resin and the fiber respectively losing 5 percent by weight according to thermogravimetric measurements, it can be said that the TOC value is remarkably low and the leaching of impurities (organic materials) has been reduced compared to Comparative Examples 1 as shown in Table 1. It seems that the deterioration of the cyclic olefin-based resin from heating during the spinning process was reduced in Example 1 through Example 5 because they had a difference in temperature of losing five percent by weight of twenty degrees Celsius or below.

Regarding how the spinning temperature of Comparative Example 1 (450 degrees Celsius) is higher compared to the spinning temperature of Example 1 (270 degrees Celsius), the cyclic olefin-based resin in Comparative Example 1 thermally decomposed during the spinning process and, as a result, it seems that the TOC value rose.

Since the nitrogen purge was not performed in Comparative Example 2, the cyclic olefin-based resin thermally decomposed due to the nitrogen during the spinning process and, as a result, it seems that the TOC value rose.

INDUSTRIAL APPLICABILITY

As explained above, the present invention is a fiber including cyclic olefin-based resin that is suitable for use by filters or medical fiber structures.

TABLE 1

| | Raw Material Resin | | | | Example 1 | Example 2 | Example 3 | Example 4 | | Example 5 | Comparative Example 1 | Comparative Example 2 |
|---|---|---|---|---|---|---|---|---|---|---|---|---|
| Cross-Section of the Fiber | — | | | | Circle type | Circle type | Circle type | Core-Sheath type | | Circle type | Circle type | Circle type |
| Resin | Resin A*[1] | Resin B*[2] | Resin B (50 mass percent PET (50 mass percent) | PP | Resin A | Resin B | Resin B | Core part PET | Sheath part Resin B | PP | Resin A | Resin B |
| Spinning Temperature (° C.) | — | — | — | — | 270 | 280 | 300 | 300 | | 300 | 450 | 310 |
| Nitrogen Purge | — | — | — | — | Yes | Yes | Yes | Yes | | Yes | Yes | No |
| Temperature of Losing Five Percent by Weight (° C.) | 443 | 449 | 453 | 385 | 435 | 436 | 432 | 452 | | 366 | 420 | 414 |
| Difference in Temperature of Losing Five Percent by Weight (° C.) | — | — | — | — | 8.0 | 13.0 | 17.0 | 1.0 | | 19.0 | 23.0 | 35.0 |
| TOC (mg/L) | — | — | — | — | 0.54 | 0.52 | 0.65 | 0.80 | | 0.93 | 1.20 | 1.70 |

*[1]Cyclic Olefin-Based Resin Copolymer (TOPAS8007S-04)

*[2]Cyclic Olefin-Based Resin Copolymer (TOPAS6013S-04)

The invention claimed is:

1. A method of filtering water or air, the method comprising:

passing water or air through a filter comprising a fiber structure made from a fiber comprising a cyclic olefin-based resin as the only resin in the fiber, wherein the cyclic-based resin is an addition copolymer of a cyclic olefin of formula (I) and an alpha-olefin or a hydrogenated product thereof:

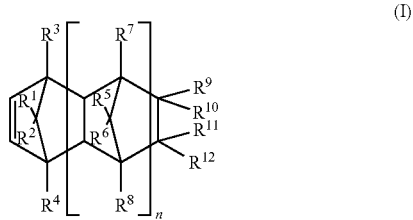

wherein
$R^1$-$R^{12}$ are each independently hydrogen, halogen or hydrocarbon;
$R^9$, $R^{10}$, $R^{11}$ and $R^{12}$ may optionally form a divalent hydrocarbon group or a cycle;
n is 0 or a positive integer and, when n is 2 or higher, $R^5$-$R^8$ may be the same or different within respective repeat units;
wherein
the fiber is obtained by a process of extruding, spinning, cooling and winding the olefin-based resin, wherein the spinning is conducted at or above a glass transition temperature of the olefin-based resin and at or below 250° C. above the glass transition temperature while supplying inert gas and removing oxygen gas, a single filament fineness of the fiber is from 0.1 to 10 dtex, and a difference between the temperature at which the olefin-based resin loses five percent by weight and the fiber obtained by spinning the olefin-based resin in the presence of an inert gas loses five percent by weight is 20 degrees Celsius or lower as measured thermogravimetrically according to JIS K 7120.

2. The method of claim 1, comprising passing water through the filter.

3. The method of claim 1, comprising passing air through the filter.

4. The method of claim 1 wherein the alpha-olefin has a carbon number of from 2 to 20.

5. The method of claim 1 wherein the alpha-olefin is one or more selected from the group consisting of ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eikosene.

6. The method of claim 1 wherein the cyclic olefin of Formula (I) comprises bicyclo[2.2.1]hept-2-ene.

7. The method of claim 1 wherein the cyclic olefin of Formula (I) is bicyclo[2.2.1]hept-2-ene and the alpha-olefin is ethylene.

* * * * *